Sept. 29, 1936.   T. C. ROLAND   2,056,075
COMBINATION BENCH, LEG REST, AND MIRROR SUPPORT
Filed Sept. 19, 1935
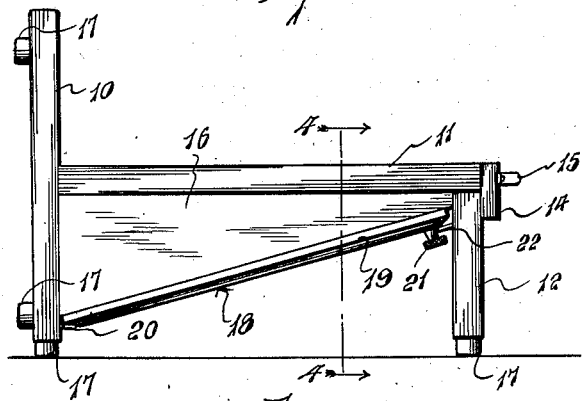
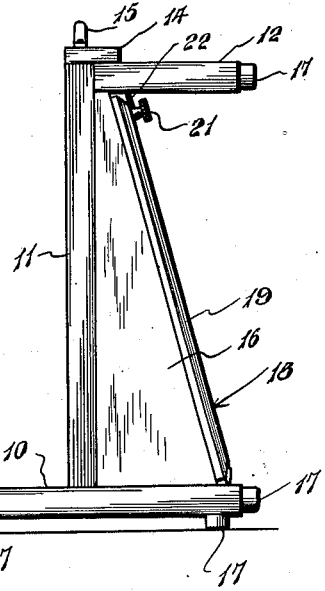
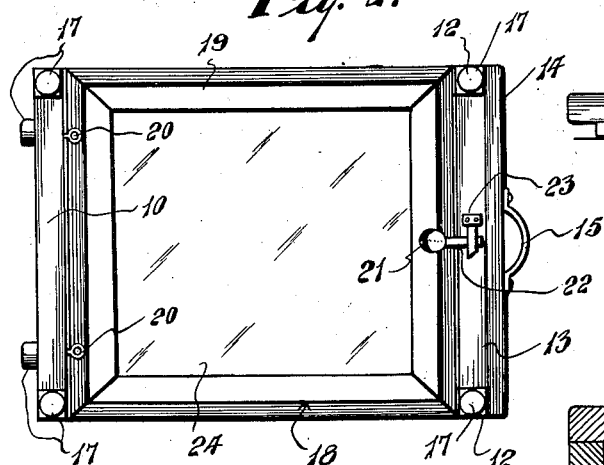
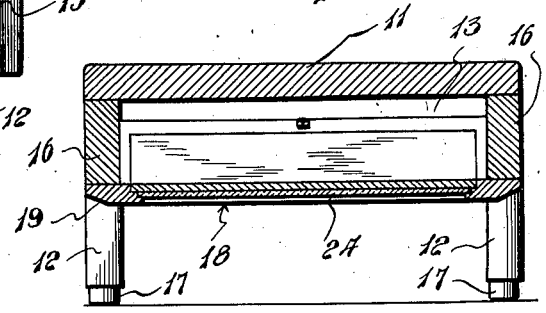
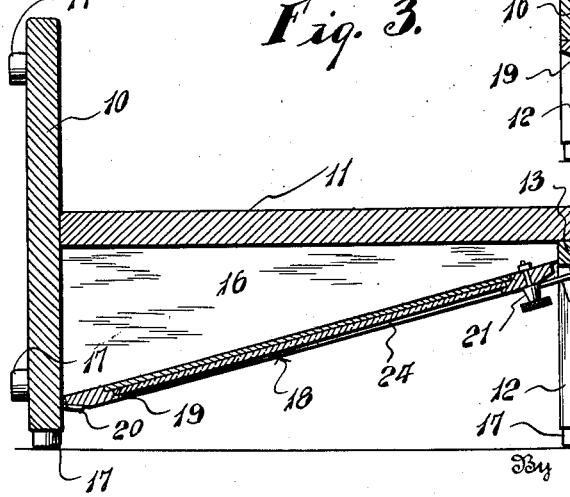
Inventor
T. C. Roland.

Patented Sept. 29, 1936

2,056,075

UNITED STATES PATENT OFFICE 2,056,075

COMBINATION BENCH, LEG REST, AND MIRROR SUPPORT

Thomas C. Roland, Bay Harbor, Fla.

Application September 19, 1935, Serial No. 41,300

3 Claims. (Cl. 155—169)

This invention relates to a combination bench, leg rest and mirror support, and aims to provide a novel article of a handy nature capable of many and varied uses, in the home, in the automobile, in hotel rooms, lobbies, or otherwise.

More specific objects and advantages will become apparent from a consideration of the description following taken in connection with accompanying drawing illustrating an operative embodiment.

In said drawing:—

Figure 1 is a view of the device in side elevation;

Figure 2 is a bottom plan view thereof;

Figure 3 is a longitudinal sectional view;

Figure 4 is a cross sectional view taken on the line 4—4 of Figure 1, and

Figure 5 is a side elevation of the device in a different position from that of Figure 1.

Referring specifically to drawing wherein like reference characters designate like or similar parts, the device comprises a back panel 10, a panel 11 secured thereto midway of its height, and legs 12, parallel to the panel 10 and depending from the forward end of the panel 11. A reinforcing strip 13 is connected to the legs 12 and to the panel 11 adjacent to the forward end of the latter. In addition, a strip 14 is fastened to bar 13 and the forward end of panel 11 and preferably equipped with a handle as at 15. Substantially triangular side members 16 are secured to panels 11 and 10, as shown.

Rests or cushions of wood, rubber or the like are provided on the panel 10 and leg 12 as at 17.

A mirror device is provided at 18, having a frame 19 resting against the inclined edges of the side members 16, the frame being held in place by eyelets or abutments 20, behind which one end is placed, while at the other end, a knob 21 is pivoted, carrying an arm 22, adapted to be moved behind a hook 23. The mirror proper, carried by the frame, is shown at 24.

The device is capable of various uses. The mirror device may be detached from the apparatus through the disengagement of the arm 22 with hook 23, after which the mirror may be suspended from a suitable support or permitted to rest on the ground, being used for any desired purpose independently of the remainder of the structure. At the same time, the mirror, while attached to the device, may be arranged in the position shown in Figure 5, wherein it constitutes a floor mirror.

In the position shown in Figure 1, the panel 11 may be sat upon and the device thus constitutes a bench. Furthermore, with the device in the position of Figures 1 and 3, one foot may rest on the panel 11 and the other foot on top of the panel 10, as during the tying of a shoestring or the like. In addition, the user may sit in a chair, with his leg supported on the panel 11 and with the shoe engaging the panel 10, the whole device of Figure 1 being tilted from the lower edge of the wall 10 as an axis. As a foot and leg rest, the device is especially desirable for use in automobiles on long trips. Further, the device may be disposed upon a counter with the mirror properly arranged.

Various changes and additional uses may be resorted to within the spirit and scope of the invention.

I claim as my invention:—

1. A device of the class described, comprising a panel adapted to assume a vertical or upright position, a panel extending therefrom intermediate its ends and at a right angle thereto, legs extending from the panel last mentioned substantially parallel to the first-mentioned panel and on one side of the second-mentioned panel only, a bar between the legs secured to the second-mentioned panel, and a strip secured to the bar and to the end of the second-mentioned panel, and substantially triangular sides secured at the base and altitude to the first-and second-mentioned panels, and means to removably secure a mirror against the hypotenuse of said sides.

2. A device of the class described, comprising a panel adapted to assume a vertical or upright position, a panel extending therefrom intermediate its ends and at a right angle thereto, legs extending from the panel last mentioned substantially parallel to the first-mentioned panel and on one side of the second-mentioned panel only, and substantially triangular sides secured at the base and altitude to the first- and second-mentioned panels, and means to removably secure a mirror against the hypotenuse of said sides.

3. A device of the class described, comprising a panel adapted to assume a vertical or upright position, a panel extending therefrom intermediate its ends and at a right angle thereto, legs extending from the panel last mentioned in parallelism to the first-mentioned panel and on one side of the second-mentioned panel only, and substantially triangular sides secured to the first- and second-mentioned panels, a mirror resting against said triangular sides, the first-mentioned panel having abutment means, behind which said mirror is disposed, a hook on the device, and a rotatable member on the mirror engageable with said hook.

THOMAS C. ROLAND.